Jan. 10, 1956     H. E. BALLARD     2,730,383
PIPE COUPLING SEALING MEANS
Filed May 17, 1952
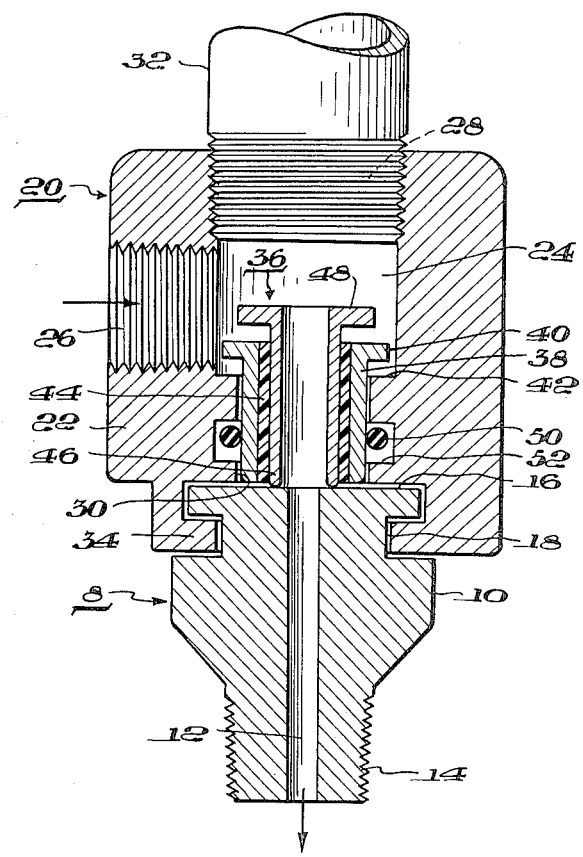
INVENTOR.
HERMAN E. BALLARD.
BY
*his* ATTORNEY.

United States Patent Office 2,730,383
Patented Jan. 10, 1956

2,730,383

PIPE COUPLING SEALING MEANS

Herman E. Ballard, Berkeley, Calif.

Application May 17, 1952, Serial No. 288,490

2 Claims. (Cl. 285—143)

This invention relates to sealing means and more particularly to means for producing a fluid-tight seal between contiguous surfaces, such as those formed on a lubrication fitting and a connected coupling.

Lubrication fittings now in use generally comprise a ported plug having an external seating surface surrounding the port. These fittings are adapted to be clamped to a coupling with the outlet of the coupling in alignment with the port of the fitting and the coupling is adapted to be connected to a source of fluid lubricant under pressure. It has long been the practice to mount an apertured slidable metallic plunger in the outlet passage of the coupling with the inner end thereof subjected to fluid pressure within the coupling, the pressure being effective to force the outer end of the plunger into sealing engagement with the seating surface on the fitting. Such an arrangement is satisfactory only as long as the coacting surfaces on the plunger and the fitting are snug-fitting. In the event that the surfaces are marred or scratched then their sealing effectiveness is destroyed. It is a principal object of this invention to overcome this disadvantage and eliminate the possibility of leakage regardless of the condition of the seating surface of the fitting.

Another object of this invention is to produce a seal by forcing a yieldable or pliant plunger against the seating surface.

Another object of this invention is to support the pliant plunger throughout its length to preclude rupture thereof.

In a preferred embodiment of this invention, the sealing plunger takes the form of a plurality of telescoped sleeves which are slidable relative to each other and which are slidably mounted in the outlet of a coupling, at least one of the sleeves being formed of a pliant material.

Other objects and advantages will become apparent from the following specification taken in connection with the accompanying drawing which is a sectional view of a coupling connected to a lubrication fitting and including sealing means embodying this invention.

Referring more particularly to the drawing, the fitting, indicated generally by the reference numeral 8, is shown as being of conventional form and comprising a body 10 having an axially extending port 12 projecting therethrough. One end of the body 10 is threaded at 14 for connection to a device which is to be lubricated and a planar seating surface 16 is formed on the other end of the body 10. An annular recess 18 is formed in the outer surface of the body 10 proximate the seating surface 16.

A conventional coupling, indicated generally by the reference numeral 20, is adapted for connection to the fitting 8 and is here shown as comprising a casing 22 having a chamber 24 formed therein. Formed in the casing 22 is a plurality, in this instance three passages 26, 28 and 30 each of which extends thrugh the casing 22 and communicates with the chamber 24. The passage 26 is an inlet passage and is adapted for communication with a source of lubricant under pressure (not shown) such as a grease gun or the like. The passage 28 is adapted to receive a relief valve 32 in a manner well known in the art. The passage 30 forms an outlet passage and is adapted for communication with the port 12 in the lubrication fitting 8 as will more fully appear hereinafter.

An arcuate flange 34 is secured to the casing 22 and spaced therefrom in substantial alignment with the outlet passage 30. The flange 34 is adapted to be inserted into the annular recess 18 formed in the lubrication fitting 8 to clamp the coupling 20 and fitting 8 together with the outlet passage 30 of the coupling in registry with the port 12 of the fitting 8. It will be apparent to those skilled in the art that the apparatus thus far described is a conventional coupling and fitting which may assume a wide variety of forms other than those herein shown and described.

To prevent leakage of lubricant under pressure between the seating surface 16 on the fitting 8 and the contiguous surface on the casing 22, sealing means must be provided. Such means takes the form of a plunger unit, indicated generally by the reference numeral 36, which is slidably mounted in the outlet passage 30 of the casing 22 and which is movable under the influence of fluid pressure within the chamber 24 into abutting sealing engagement with the seating surface 16 of the fitting 8.

The plunger unit 36 comprises a first sleeve 38 of metallic material slidably mounted in the outlet passage 30 and provided with a radially extending flange 40 on the inner end thereof. The flange 40 is engageable with a suitable shoulder 42 formed on the wall of the chamber 24 to limit axial movement of the sleeve 38 and prevent withdrawal thereof from the coupling 20. Slidably mounted within the sleeve 38 is a second sleeve 44 of pliant material. The sleeve 44 is formed of a yieldable material such as a plastic which has the ability to flow under pressure for a purpose which will more fully appear.

A third sleeve 46 of metallic material is slidably mounted within the sleeve 44 and is provided at its inner end with a radially extending flange 48 which is engageable with the flange 40 formed on the sleeve 38 to thereby limit axial movement of the sleeve 46 and prevent withdrawal thereof from the casing 22. The sleeve 46 is preferably of a length greater than the length of the sleeves 44 and 38 so that the flange 48 carried by the sleeve 46 is normally spaced from the ends of the sleeves 44 and 38. Thus, the inner ends of the sleeves 44 and 38 will be exposed to fluid pressure within the chamber 24.

Sealing means is provided between the sleeve 38 and the walls of the outlet passage 30 and is such as to permit slidable movement of the sleeve 38. This means is here shown as comprising a resilient annular element 50 of the O-ring type encircling the sleeve 38 and disposed within a recess 52 formed in the wall of the outlet passage 30.

In operation, the coupling 20 is connected to the fitting 8 as shown in the drawing and fluid lubricant under pressure is supplied to the chamber 24 through the inlet passage 26. The fluid pressure within the chamber 24 will act on the inner ends of the sleeves 38, 44 and 46 and will move the same axially into engagement with the seating surface 16 on the fitting 8. If the seating surface 16 is smooth, engagement of the metallic sleeves 38 and 46 therewith will be effective to provide a fluid-tight seal. However, in the event that the seating surface 16 is irregular or marred by scratches or the like, the end surfaces of the metallic sleeves 38, 46 will not be precisely complemental therewith and will be ineffective to produce an adequate seal. Under such conditions, the fluid pressure within the chamber 24, acting upon the pliant sleeve 44, will force the same to flow into any indentations in the surface 16 to thereby produce an effective seal. It will be apparent that the sleeves 38, 48 will support the pliant sleeve 44 and preclude extrusion thereof between the contiguous surfaces of the coupling 20 and the fitting 8 and will further preclude rupture of the pliant sleeve 44 when high pressures are used.

When fluid pressure is released from the chamber 24 and the coupling 20 is removed from the fitting 8, the plunger unit 36 will be maintained within the coupling 20 by coaction of the flange 40 with the shoulder 42 and coaction of the flange 48 with the flange 40. Thus, while the plunger unit 36 is comprised of a plurality of units which are slidable relative to each and slidable relative to the casing 22, the coupling 20 may be handled in any desired manner without danger of the plunger unit 36 becoming separated therefrom.

In the event that the coupling 20 is removed from the fitting 8 while fluid under pressure still remains within the chamber 24, such fluid pressure will move the flange 40 into engagement with the shoulder 42 and will likewise move the flange 48 into engagement with the flange 40. When such movement occurs, the flange 40 will prevent retraction of the sleeve 38 from the outlet passage 30. Meanwhile, the flange 48 is effective to limit outward movement of the sleeve 46. Furthermore, when the flange 48 abuts the flange 40, the former will overlie the pliant sleeve 44 effectively to shield the same from the fluid pressure within the chamber 24 and prevent extrusion of the sleeve 44 under such pressure.

It will be apparent to those skilled in the art that the illustrated embodiment of this invention may be variously changed and modified, or features thereof, single or collectively, embodied in other combinations than that illustrated without departing from the scope of the invention defined in the appended claims or sacrificing the advantages thereof, and that accordingly the disclosure herein is illustrative only and the invention is not limited thereto.

It is claimed and desired to secure by Letters Patent:

1. A coupling comprising a casing having communicating inlet and outlet passages formed therein, said inlet passage being adapted to be connected to a source of fluid under pressure, said outlet passage being adapted for registry with an external seating surface, a first rigid sleeve slidably mounted in said outlet passage, abutment means on said first sleeve and engageable with said casing for limiting axial movement of said sleeve, sealing means between said first sleeve and said casing, a second sleeve of pliant material slidably mounted in said first sleeve with one end thereof exposed to fluid pressure within the coupling and movable under the fluid pressure to force the other end thereof into sealing engagement with the external seating surface regardless of any irregularities of the surface, a third rigid sleeve slidably mounted in said second sleeve, and abutment means on said third sleeve operatively engageable with said casing for limiting axial movement of said third sleeve.

2. A coupling as claimed in claim 1 wherein said last named abutment means comprises a flange extending beyond said second sleeve to be engageable with said first sleeve for shielding said second sleeve from fluid pressure within the coupling.

References Cited in the file of this patent
UNITED STATES PATENTS

| | | |
|---|---|---|
| 519,805 | Bavier | May 15, 1894 |
| 2,115,984 | Bock | May 3, 1938 |
| 2,307,328 | Martin | Jan. 5, 1943 |
| 2,360,732 | Smith | Oct. 17, 1944 |
| 2,362,880 | Campbell | Nov. 14, 1944 |